(12) United States Patent
Denny et al.

(10) Patent No.: US 7,082,428 B1
(45) Date of Patent: Jul. 25, 2006

(54) SYSTEMS AND METHODS FOR COLLABORATIVE SEARCHING

(75) Inventors: Michael S. Denny, Sharpsburg, GA (US); Lou Topfl, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 442 days.

(21) Appl. No.: 10/244,261

(22) Filed: Sep. 16, 2002

(51) Int. Cl.
*G06F 17/30* (2006.01)

(52) U.S. Cl. .................................. 707/5; 707/4; 707/10
(58) Field of Classification Search .................. 707/3, 707/4, 5, 6, 10
See application file for complete search history.

(56) References Cited

U.S. PATENT DOCUMENTS

| | | | |
|---|---|---|---|
| 6,253,208 B1 * | 6/2001 | Wittgreffe et al. | 707/104.1 |
| 6,314,420 B1 * | 11/2001 | Lang et al. | 707/3 |
| 6,321,228 B1 * | 11/2001 | Crandall et al. | 707/10 |
| 6,347,313 B1 * | 2/2002 | Ma et al. | 707/3 |
| 6,430,558 B1 * | 8/2002 | Delano | 707/5 |
| 6,539,377 B1 * | 3/2003 | Culliss | 707/5 |
| 6,615,209 B1 * | 9/2003 | Gomes et al. | 707/5 |
| 6,732,088 B1 * | 5/2004 | Glance | 707/3 |
| 6,745,178 B1 * | 6/2004 | Emens et al. | 707/3 |
| 6,832,218 B1 * | 12/2004 | Emens et al. | 707/3 |

OTHER PUBLICATIONS

Romano et al., Collaborative Information Retrieval Environment Integration of Information Retrieval with Group Support Systems, System Sciences, 1999. HICSS-32. Proceddings of the 32nd Annual Hawaii Inter. Conf. on, vol. Track1, Jan. 1999, p. 1-10.*
"Product Overview: For Information to Have Value, It Must First Be Accessible," COPERNIC: Enterprise Solutions, p. 1 of 1, 2002 Copernic Technologies, Inc.

* cited by examiner

*Primary Examiner*—Greta Robinson
(74) *Attorney, Agent, or Firm*—Merchant & Gould

(57) ABSTRACT

Systems and methods for collaborative searching are described. In an embodiment of the present invention, a database stores previously executed queries and corresponding results. An application server compares an entered query with the previously executed queries. If the application server finds a query that is substantially similar to the entered query, the application server returns the results corresponding to the previously executed query. If no substantially similar result is found, the query is executed against one or more data sources. When results are returned, an embodiment provides the user with the ability to rate them. The ratings are used to determine the similarity of various queries.

3 Claims, 3 Drawing Sheets

SYSTEMS AND METHODS FOR COLLABORATIVE SEARCHING

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention relates to database search methods and systems. The present invention relates particularly to systems and methods for searching large massive information networks, such as the Internet.

BACKGROUND OF THE INVENTION

The Internet has become a valuable resource for organizations, particularly for the research needs of the organization's members. It is a common practice for members of an organization to search information networks, such as the Internet, for information using commercially available search engines. Unfortunately, these searches may result in at least as many irrelevant results as relevant ones. Also, a multi-member organization has a need for quickly disseminating the information gleaned from this research among its members. Conventionally, these results are shared by sending email links to other members of the organization or by saving the resultant documents in a common repository. Presently, there exists no method for either noting which results of an Internet search are relevant to the organization or for capturing relevant results along with the queries for other members' use; resultantly, multiple members of an organization may repeatedly search for the same information in the same information networks. Often, these duplicate searches will not have the same results, and even if they do, unnecessary duplication of an acceptable prior search wastes the time and effort of the secondary searcher. Additionally, there exists a threat that if two or more searchers do not arrive at the same result, at least one searcher will have arrived at an incorrect finding. It should also be noted that with current methods of searching, multiple members of the organization must be trained in the art of searching.

Some have attempted to solve these problems on a larger scale than a single organization, as seen in U.S. Pat. Nos. 6,321,228, 6,314,420, and 6,253,208. The '228 patent discloses a collections database that includes "records that other users deem relevant to a search topic and that are selected from result sets derived with earlier search queries." See Abstract. The '420 patent discloses a "collaborative/content-based filter to make continuing searches for information entities which match existing wire queries and are ranked and stored over time in user-accessible, system wires corresponding to the respective queries," as well as a "user feedback system [that] provides collaborative feedback data." The '208 patent discloses an "information access system [that] is provided to create and maintain a rapidly accessible index to information extracted from information sources accessible over the Internet."

The conventional attempts to address the needs to share research suffer from numerous drawbacks. Since multiple duplicative searches are performed, they require substantially more bandwidth than is necessary. Also, both the user interfaces and the back-end processing systems are relatively inflexible.

SUMMARY OF THE INVENTION

Embodiments of the present invention provide systems and methods for collaborative searching. A system according to the present invention includes an information network, which includes at least one data source, and an application server in communication with the information network. The application server receives a query and provides either previously retrieved results from a substantially similar or identical query or provides new results from the data source.

To perform this functionality, the application server includes a database of previously executed queries, the results of the previously executed queries, and ratings of the results. The ratings may include, for example, a rating of how relevant a particular result was to the search performed. The application server also includes a results engine for determining the similarity between an entered query and a previously executed query. The application server also includes a metasearch engine in communication with the results engine. The metasearch engine provides the application server with the capability to execute the newly entered queries against one or many external data sources, such as websites on the Internet. In one embodiment, the metasearch engine is a commercially available tool for performing web searches.

In one embodiment of the present invention, the database includes a user profile. The application server utilizes the user profile for various purposes, including calculating relevancy ratings of the results of previously executed queries. Another embodiment includes a recommendation engine. The recommendation engine provides the user with feedback to improve the searching process. The recommendation engine may be a rules-based expert system.

An embodiment may receive queries from numerous sources. One embodiment receives queries from a user interface. The user interface may comprise a custom application, a web-enabled user interface, a voice-enabled user interface, or some other means for receiving the query. The interface may include natural language capabilities. The interface also allows the user to rate the results of a query as relevant or accurate or by some other meaningful attribute.

One embodiment of the present invention includes a query evolution-monitoring component. A subject matter expert (SME) uses this component to monitor the evolution of the information obtained and stored in the database, create a work-flow process behind the scenes to indicate that new content has been found, and perform updates to the database to improve its relevancy and accuracy.

The present invention has numerous advantages over the prior art, of both a technological and practical nature. The present invention saves bandwidth for both the organization using the invention and for the larger community using the information network as a whole. If the database contains a substantially similar query to the one presently entered, and a corresponding acceptable result, the entire process is completed without performing a new search of the information network, reducing the use of the bandwidth available to the organization, and to the larger community using the information network.

Another advantage realized by the present invention when an entered query is acceptably answered without contacting the information network is a faster processing time, as any associated transmission delays between the organizational or local system and the information network have been eliminated.

Yet another advantage realized by the present invention is a decrease in system implementation costs, as a process implemented on an organizational or local level to serve only the members of the organization has a lower cost than one implemented to serve the larger community using the information network.

Another advantage realized by the present invention is the relative ease of troubleshooting. When implemented on an organizational or local level, the process will be easier to troubleshoot if an interruption of service occurs, resulting in a quicker repair time, greater process reliability, and less lost productivity due to process unavailability.

Yet another advantage realized by the present invention is the ability of the organization using it to exclude others from accessing the locally stored information. Some queries and/or acceptable results may be proprietary in nature. Implementation of the process on an organizational or local level allows for the use of a firewall to prevent others from accessing the local database and its contents, giving the organization a possible competitive advantage.

Another advantage of the present invention is the new ability of the organization to easily monitor the history of its members' queries. An organization could use this information to help increase member productivity, better focus member training programs on problem areas, or to curtail inappropriate member behavior.

Further details and advantages of the present invention are set forth below.

DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention provide systems and methods for collaborative searching. A system stores previously executed queries, the results from the queries, and the user's ratings of the relevancy, accuracy, and other attributes of the results. When the system subsequently receives a substantially similar query, the system attempts to use the previously stored information to respond to the new query.

Figure 1:
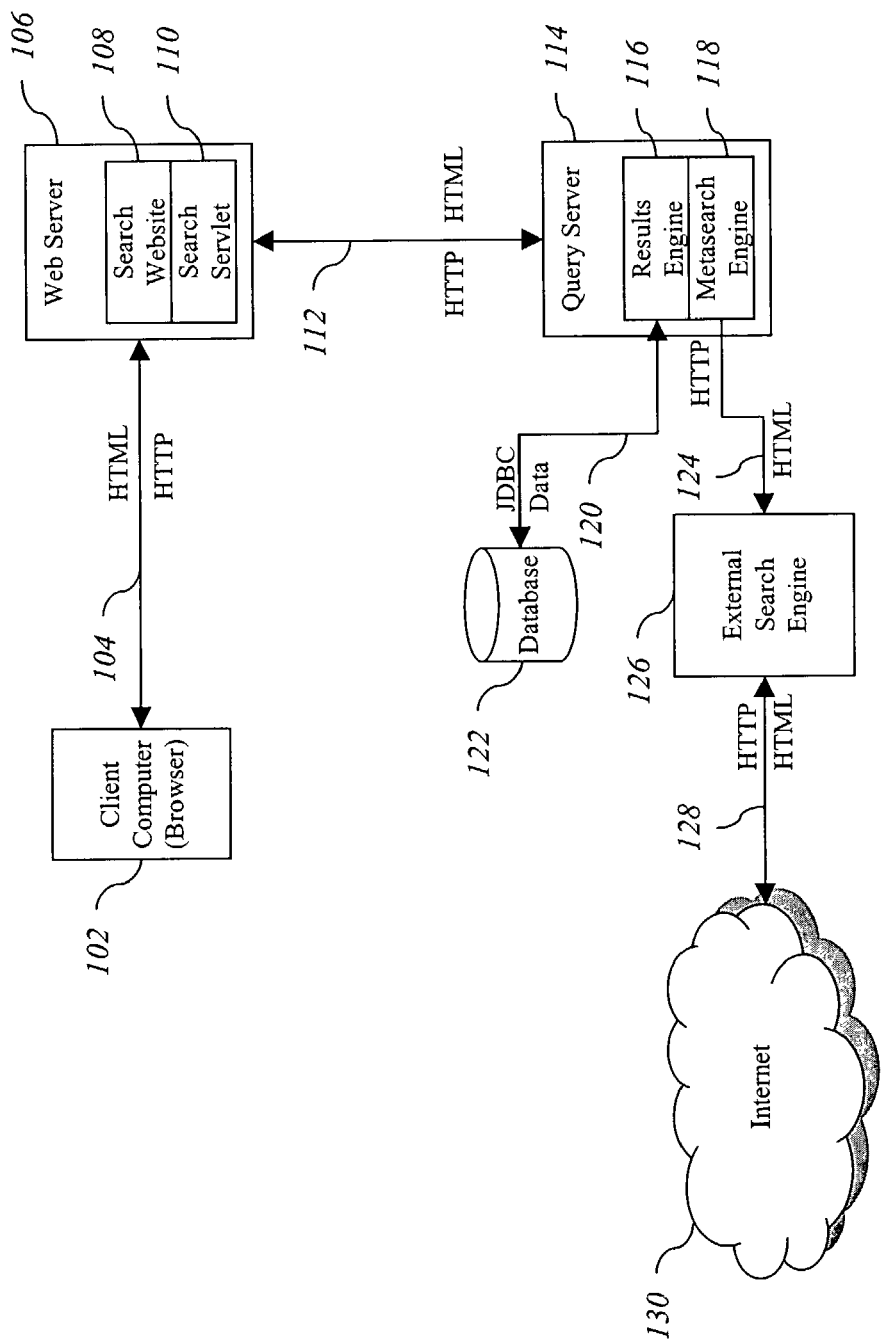
FIG. 1 is a block diagram of an exemplary operating environment for an embodiment of the present invention.

Referring now to the drawings, in which like numerals represent like elements throughout the several figures, FIG. 1 illustrates an exemplary environment in which the present invention may be implemented and operated. Those skilled in the art will appreciate that the invention may be practiced with other computer system configurations, including multiprocessor systems, other microprocessor-based or programmable electronic devices, minicomputers, mainframe computers, and the like. In the embodiment shown in FIG. 1, a user issues a query using a client computer 102. In the embodiment shown, the user interface is a hypertext markup language (HTML) page that the user accesses via a browser. Various other types of interfaces, including custom-designed graphical user interfaces and voice interfaces may be implemented in an embodiment. The interface on the client computer 102 may appear very similar to conventional Internet search interfaces. However, the interface will likely include additional features to support the processes necessary to implement the result-sharing features of the present invention.

The browser on the client computer 102 issues hypertext transfer protocol (HTTP) requests and receives HTML pages over a communication link 104. The communication link 104 is also connected to a web server 106. The communication link 104 may be a direct link between the two servers or may be a network, including a plurality of components.

The web server 106 is capable of receiving various types of requests, such as HTTP and file transfer protocol (FTP) requests, and responding appropriately. The web server 106 shown is also capable of executing applications. For example, in one embodiment, the web server 106 includes Microsoft Internet Information Server (IIS). IIS supports Active Server Pages (ASP), which is an application platform that supports the creation of dynamically generated HTML pages. In such an embodiment, HTTP requests may result in the execution of ASP programs. In another embodiment, web server 106 includes the Apache web server. Like ASP, servlets on the web server 106 provide the capability to dynamically generate HTML pages in response to requests from users. In yet another embodiment, the web server 106 may be a Java2 Enterprise Edition (J2EE) compliant application server. Like ASP, Java Server Pages (JSP) applications on the application server interface with Enterprise Java Beans (EJB) applications on the application server to provide the capability to dynamically generate HTML pages in response to requests from users.

In the embodiment shown in FIG. 1, the web server 106 directs the HTTP request from client computer 102 to a search website 108. The search website 108 causes the execution of a search servlet 110. The search servlet 110 issues an HTTP request over a communication link 112 to a query server 114. The query server 114 includes a results engine 116 and a metasearch engine 118. The results engine 116 issues JDBC requests over a communications link 120 to a database 122. The database 122 stores previously executed queries, results, and ratings of the results. The results engine 116 allows the query server 114 to provide the previously obtained results when the stored query and the new query are substantially similar.

The metasearch engine 118 provides the capability of executing queries that are not substantially similar to previously executed queries. The metasearch engine 118 issues HTTP requests over a communication link 124 to external search engines 126 such as Google or AltaVista and receives HTML results in return. The metasearch engine 118 provides the capability of issuing requests to a single external search engine 126 or to a plurality of search engines simultaneously. The external search engine 126 utilizes various methods, such as crawling, to communicate via communication link 128 with various sites on the Internet 130. In one embodiment, the metasearch engine 118 is an external search engine 126. The query server 114 utilizes an existing search engine to provide results to queries issued by the users.

Figure 2:
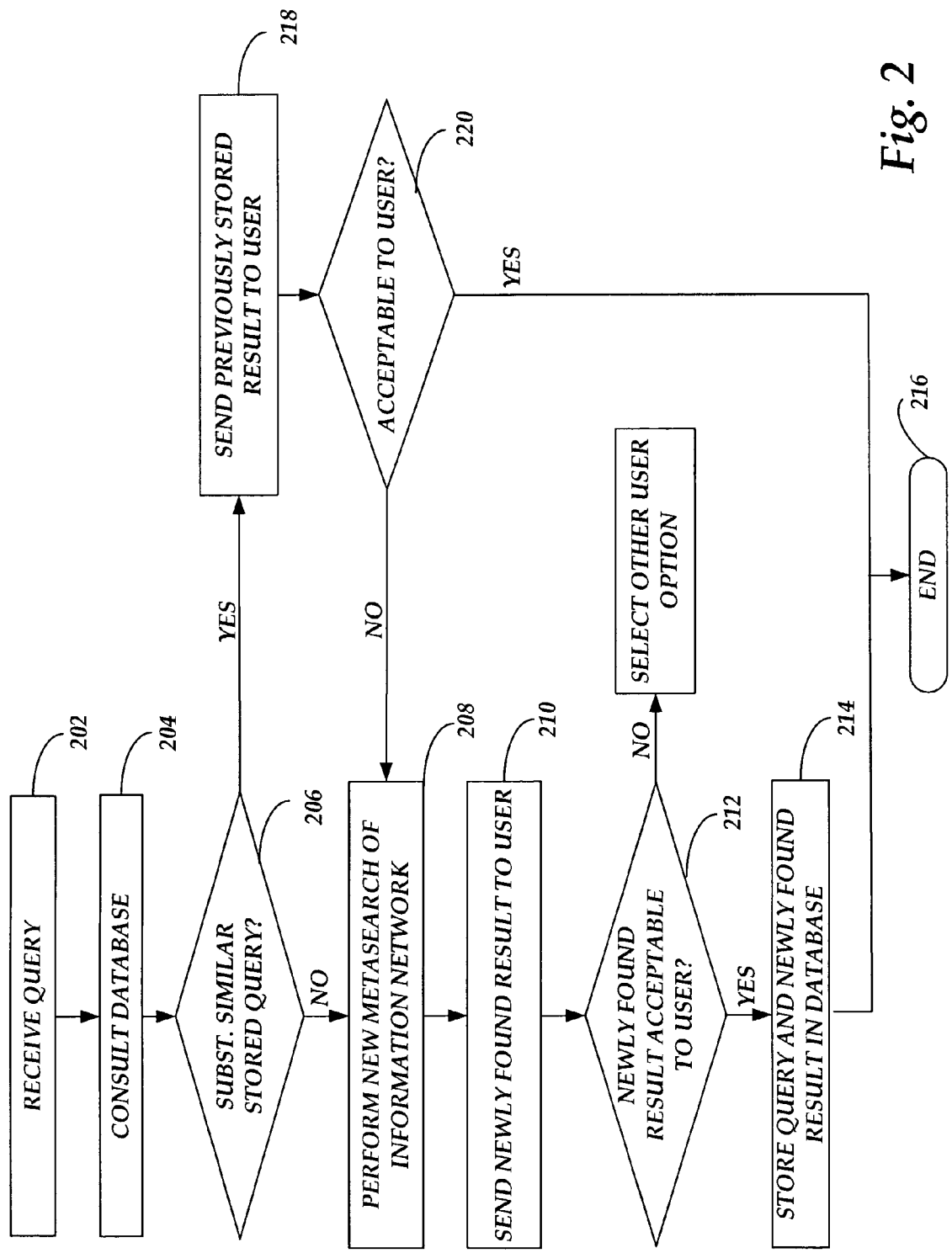
FIG. 2 is a flow diagram illustrating steps of an exemplary process for performing a query in accordance with an embodiment of the present invention.

FIG. 2 is a flowchart, illustrating the process that one embodiment of the present invention implements to accept queries and provide results. The process shown begins when the query server (114) receives a query 202. The query server 202 sends the query to the results engine (116), which sends a query to the database (122) 204. The results engine (116) attempts to find a substantially similar locally stored query 206. If the results engine (116) is unable to find one, it submits the query to the metasearch engine (118), which performs a new metasearch of the information network (130) 208.

Substantial similarity is defined in various ways. For example, in one embodiment, if greater than X %, for example 90%, of the keywords of a query are the same as a stored query, then the queries are substantially similar. In another embodiment, a natural language engine is used to construct searches based on a user's query. The natural language engine breaks the query down into constituent parts and then compares the constituents with previously executed queries. Natural language engines use sophisticated computational linguistic theories and natural language technology to retrieve relevant results for a given query. For example, natural language query engines typically map queries to associated concepts (ex: "murder" is mapped to "stabbed to death").

The metasearch engine (118) returns the newly found results to the user 210. The user then indicates whether or not the results are acceptable 212. The user determines the acceptability based on relevancy to the original query. In addition, the user may rate the results based on their relevancy or some other attribute. If the user determines that the results are acceptable, the query and the newly found results are stored in the database (122) 214 and the process ends 216. If not, the user has several options, including issuing a new query or obtaining the information from another source.

If the user issues a query that is substantially similar to a previously stored query, the query server (114) sends the results to the user 216. The user then determines whether the previously stored results are acceptable 220. If they are, the process ends 216. If they are not, then the system proceeds through the process steps 220–216 as in the case where a substantially similar query did not exist in the database (122) initially.

Embodiments of the present invention may include processes to validate that particular results are relevant and accurate. For example, in one embodiment, a subject matter expert (SME) periodically reviews the database 122 to insure that the results are relevant and accurate in relation to the corresponding queries. The SME is able to change ratings, add and remove queries and results, and perform various other functions necessary to maintaining the database 122.

In another embodiment of the present invention, the database 122 includes a user profile table or set of tables. The user profile provides relevant information for matching queries and result sets. For example, if two users have similar profiles, it may be likely that results that are relevant to one of the users are relevant to the other. In contrast, if the profiles are very different, the relevancy rating given to a result set may be less useful in determining the usefulness of an existing set of results.

The user profile may include information, such as the department in which the user works, the position, and additional information relevant to information request performed by the user. Two users in the same department and in similar positions would conceivably be interested in similar results to similar queries. However, two users in different departments and different positions may not be interested in the same results.

In one embodiment, the database 122 includes a user profile table, which is the primary table storing relevant attributes for each user. The database 122 also includes additional tables, which relate every value for each attribute to every other value for each attribute. The results engine 116 uses these values to determine a relatedness value for each pair of attributes. For example, if an organization has three positions, "Research Scientist," "Research Assistant," and "Computer Programmer," the value for relevancy between "Research Scientist" and "Research Assistant" is higher than the value between "Research Scientist" and "Computer Programmer." A simple mathematical algorithm is capable of sorting the user profile relevancy ratings in a meaningful manner. In another embodiment, the user profile table could be stored in an external LDAP directory server. In this embodiment, the database 122 would only need to store the additional tables that establish the associations between the pairs of attributes.

Another embodiment of the present invention includes a recommendation engine. The recommendation engine includes a rules manager. The rules manager executes a series of pre-defined rules in order to predict further research that may be helpful to the user. The rules engine extracts relevancy and user profile data from the database 122 in order to make recommendations.

One embodiment of the present invention includes multimodal interfaces; in other words, multiple interface methods to gain access to the query functionality. Interfaces could include a voice-enabled user interface, a Wireless PDA interface, and a WAP interface, for example. In FIG. 1, the Web Server 106 would be replaced by a corresponding modality engine for the appropriate modality (ex: a voice processing server for the voice-enabled user interface). Using a modality-based user interface, the user enters a query and the corresponding modality engine sends the query to the query server 114. The process continues as shown in FIG. 2. When results are presented to a voice-enabled user interface, for example, they may be presented as audio listings of results. The voice-enabled interface would then provide the user with the ability to rate the results using the keypad on the telephone.

Figure 3:
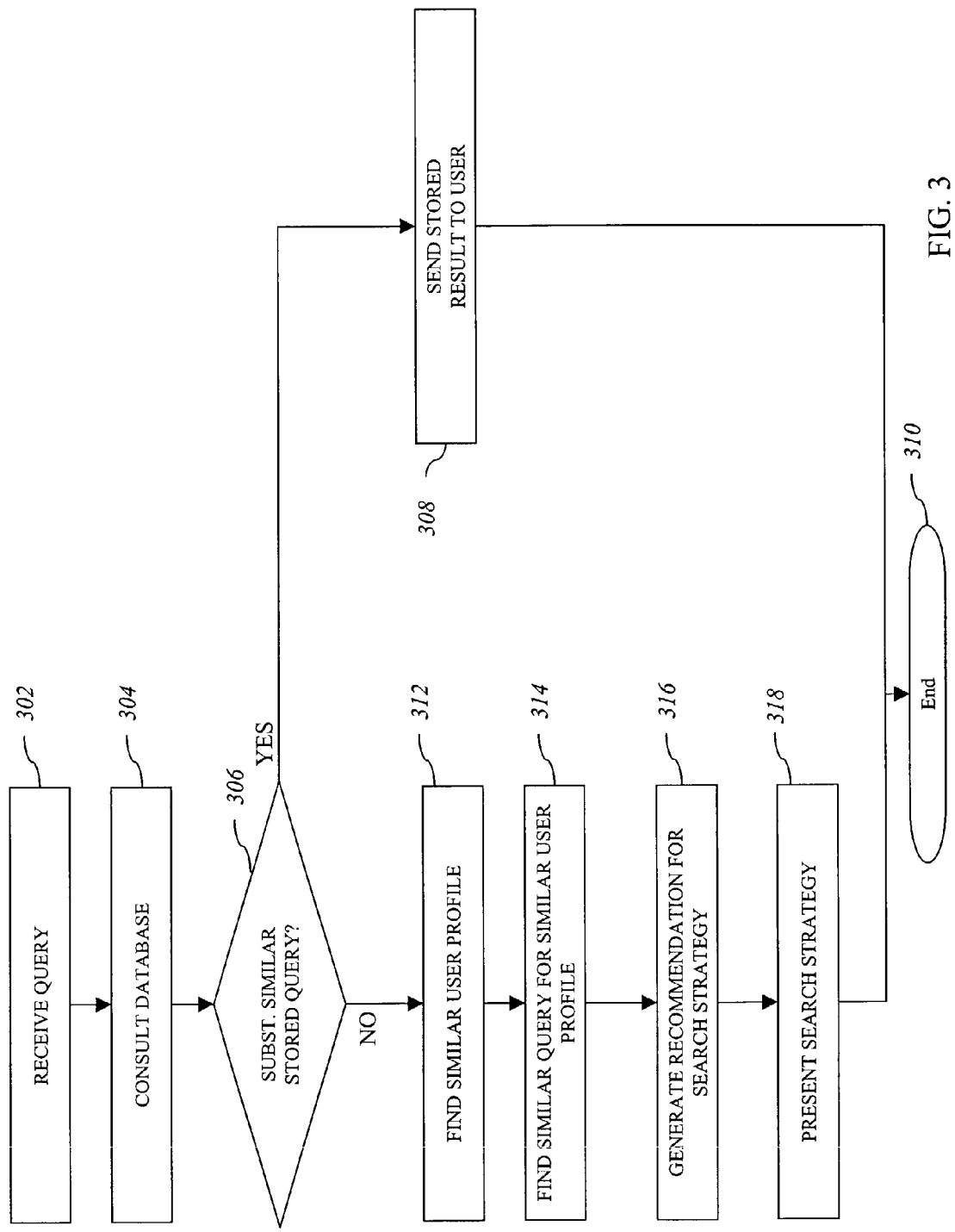
FIG. 3 is a flow diagram illustrating steps of an exemplary recommendation process in accordance with an embodiment of the present invention.

FIG. 3 is a flow diagram, illustrating a recommendation process in an embodiment of the present invention. In the embodiment illustrated by FIG. 3, query server (114) includes a recommendation engine (not shown). The recommendation engine includes software components for making query recommendations to the user. According to the process shown, the query server (114) receives a query 302. As in the process illustrated by FIG. 2, the results engine (116) consults the database 304. If the results engine (116) finds a substantially similar query 306, the results engine (116) returns the previously stored results to the user 308. The process then ends 310.

If the results engine (116) fails to find a substantially similar result, the results engine (116) passes the query to the recommendation engine. The recommendation engine searches the database (122) for a user profile that is similar to the current user's 312. The recommendation engine then searches the database (122) for a query that is at least somewhat similar to the entered query 314. The stored query may be similar in that it shares keywords with the entered query but falls below the threshold of substantial similarity. For example, in one embodiment, substantial similarity is defined as two queries sharing 90% of their keywords. Queries sharing 80% are similar but not substantially similar.

Based on the results of the search, the recommendation engine generates a recommendation 316. For example, in one embodiment, the recommendation engine generates a list of queries that might be of interest to the user based on the query the user entered. The recommendation engine then presents the recommended search strategy 318.

An embodiment of the present invention may be implemented by an organization internally. The organization may either develop the application independently or purchase the components, hardware and software, from a vendor. Alternatively, a service provider may implement an embodiment of the present invention. The service provider is then able to charge a subscription or per-use rate to users of the application.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. A computer-implemented method for searching information network-based content, comprising:
   receiving a first query;
   searching a database for a second query wherein the second query bears a predetermined substantial similarity to the first query, before executing the first query;
   upon finding the second query, retrieving the second query and a corresponding result of the second query from the database and presenting the corresponding result and the second query;
   determining whether the corresponding result is acceptable;
   if the corresponding result is not acceptable, executing the first query in an information network and presenting a new result based on the execution of the first query;
   upon failing to find a second query, executing the first query in an information network and presenting a result based on the execution of the first query;
   accepting a rating of the new result; and
   storing said rating in said database.

2. A computer-implemented method for searching information network-based content, comprising:
   receiving a first query;
   searching a database for a second query, wherein the second query bears a predetermined substantial similarity to the first query, before executing the first query;
   upon finding the second query, retrieving the second query and a corresponding result of the second query from the database and presenting the corresponding result and the second query;
   accepting a rating of the corresponding result;
   storing the rating in the database; and
   upon failing to find a second query, executing the first query in an information network and presenting the result of the first query.

3. A computer-implemented method for searching information network-based content, comprising:
   receiving a first query;
   searching a database for a second query, wherein the second query bears a predetermined substantial similarity to the first query, before executing the first query;
   upon finding the second query, retrieving the second query and a corresponding result of the second query from the database and presenting the corresponding result and the second query;
   upon failing to find a second query, executing the first query in an information network and presenting an original the result of the first query; and
   recommending a search strategy in response to receiving the first query.

* * * * *